(12) United States Patent
Hulten et al.

(10) Patent No.: US 7,097,010 B1
(45) Date of Patent: Aug. 29, 2006

(54) BRAKE DISC FOR A VEHICLE DISC BRAKE

(75) Inventors: Johan Hulten, Gothenburg (SE); Ingemar Dagh, Gothenburg (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 10/110,722

(22) PCT Filed: Oct. 13, 2000

(86) PCT No.: PCT/SE00/01989

§ 371 (c)(1),
(2), (4) Date: Aug. 27, 2002

(87) PCT Pub. No.: WO01/27490

PCT Pub. Date: Apr. 19, 2001

(30) Foreign Application Priority Data

Oct. 15, 1999 (SE) .................................... 9903717

(51) Int. Cl.
*F16D 65/847* (2006.01)
(52) U.S. Cl. ..................... 188/264 AA; 188/218 XL
(58) Field of Classification Search ......... 188/218 XL, 188/264 R, 264 A, 17, 26, 264 AA
See application file for complete search history.

(56) References Cited

U.S. PATENT DOCUMENTS

| | | | | |
|---|---|---|---|---|
| 2,849,092 A * | 8/1958 | Foster | .................... | 188/264 R |
| 3,081,842 A * | 3/1963 | Zindler et al. | ........ | 188/218 XL |
| 3,318,424 A * | 5/1967 | Morrison | ............... | 188/264 AA |
| 3,899,054 A * | 8/1975 | Huntress et al. | ...... | 188/218 XL |
| 4,811,822 A * | 3/1989 | Estaque | ................... | 188/264 A |
| 4,982,127 A * | 1/1991 | Marandet | .............. | 188/264 AA |
| 5,107,966 A * | 4/1992 | Metzler et al. | ....... | 188/264 AA |
| 6,422,358 B1* | 7/2002 | Deibel | .................. | 188/218 XL |

FOREIGN PATENT DOCUMENTS

| | | | | |
|---|---|---|---|---|
| DE | 1 164 455 | * | 3/1964 | ............. 188/264 A |
| DE | 39 42 651 | | 7/1991 | |
| EP | 0 308 048 A1 * | | 3/1989 | .......... 188/218 XL |
| GB | 239862 | * | 4/1926 | ............. 188/264 A |
| JP | 58-149428 A | * | 9/1983 | .......... 188/218 XL |
| JP | 62-297549 A | * | 12/1987 | .......... 188/218 XL |
| JP | 08061403 A | * | 3/1996 | |
| WO | WO 93/14947 | | 8/1993 | |

* cited by examiner

Primary Examiner—Thomas J. Williams
(74) Attorney, Agent, or Firm—Young & Thompson

(57) ABSTRACT

Brake disc for a vehicle disc brake, comprising a radially inner hub portion (1a), intended to be non-rotatably joined to a wheel hub, and a surrounding, radially outer disc portion with opposing friction surfaces. The outer disc portion is formed by two disc elements (4) joined to the hub portion, and which are separated by spacers (7a–7f), which define passages for cooling air and of which at least some (7a, 7b) are in the form of fan vanes to generate an airflow from the passage inlets (10) at the outer periphery of the disc to the passage outlets (11) at the outer periphery of the disc.

12 Claims, 3 Drawing Sheets

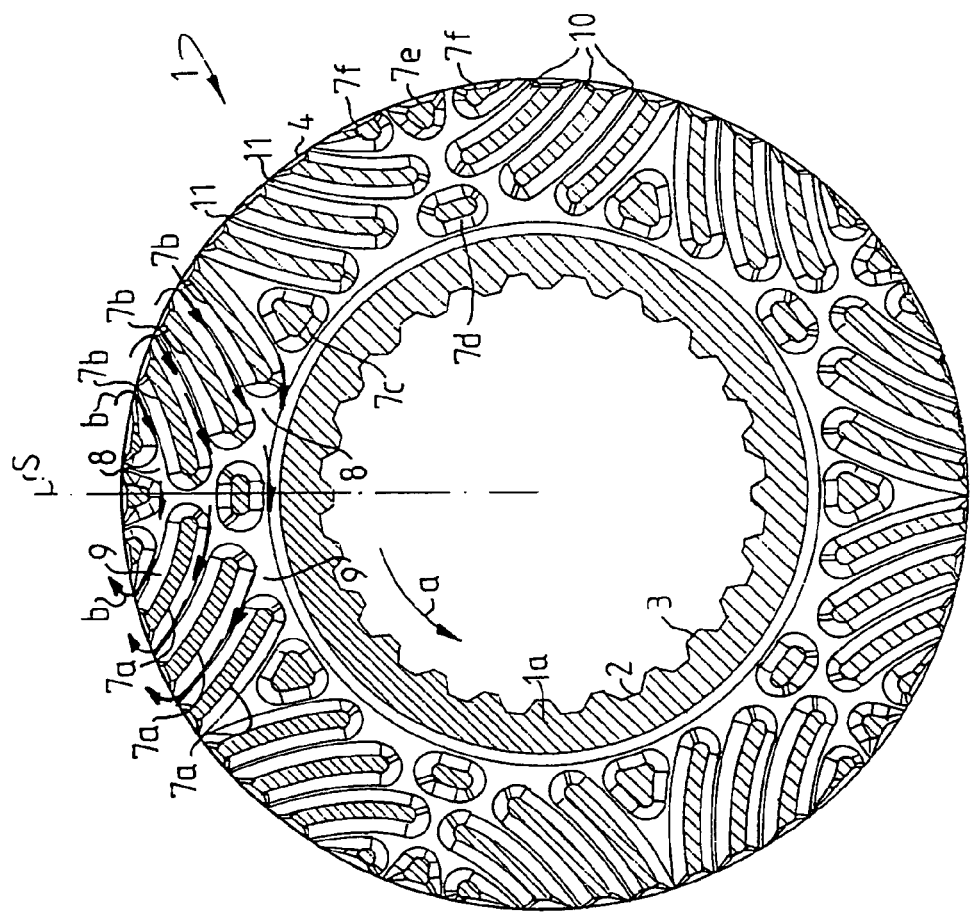
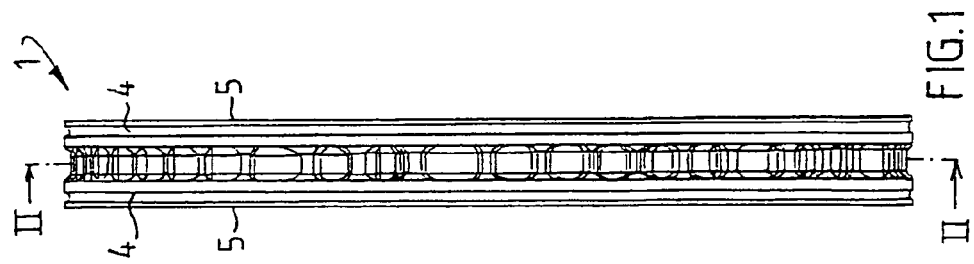
FIG. 2
FIG. 1

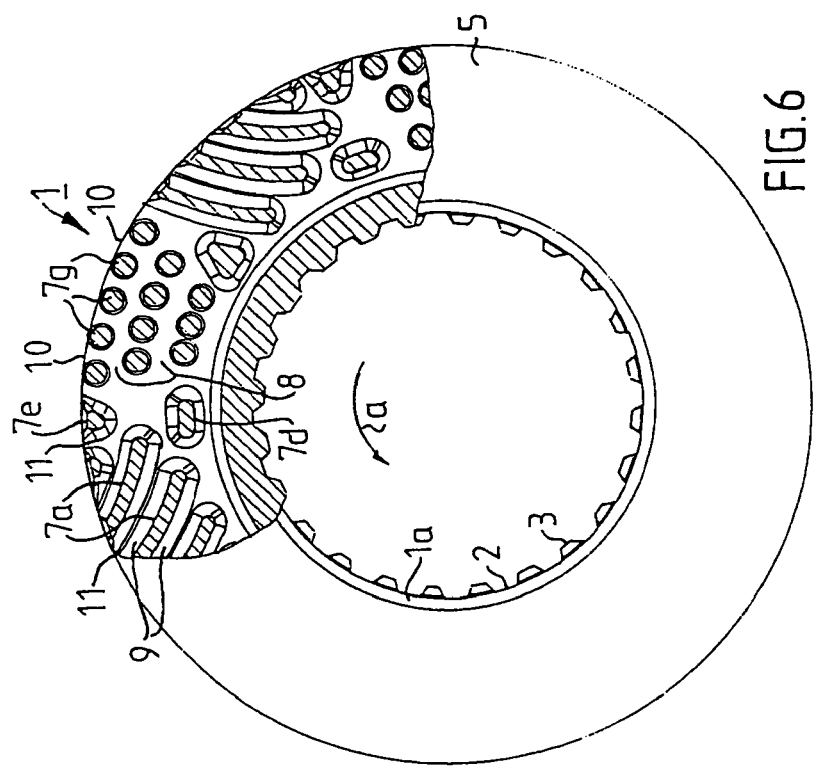
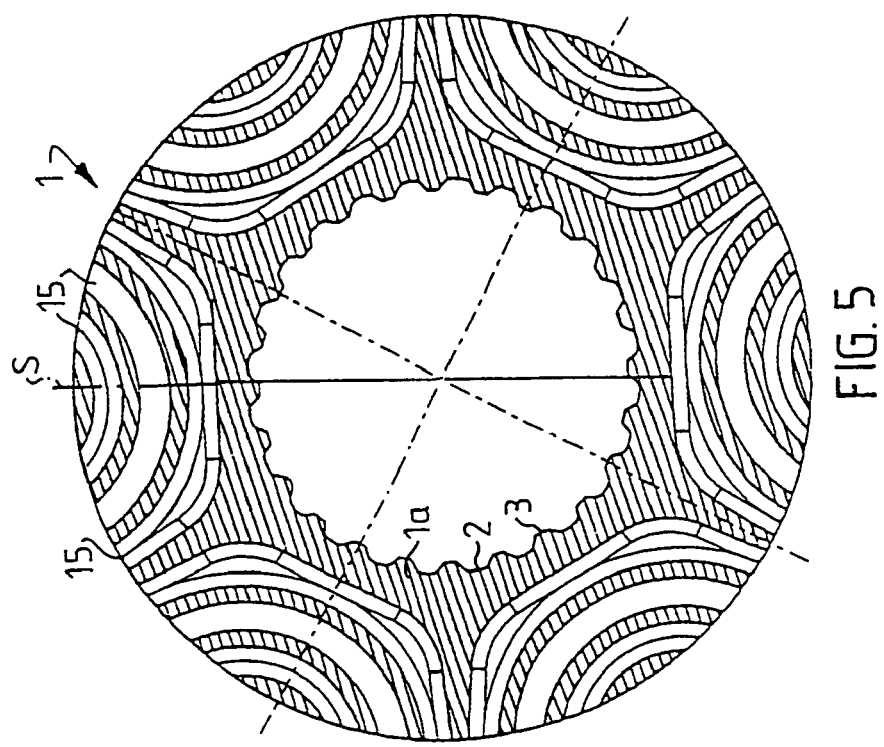

BRAKE DISC FOR A VEHICLE DISC BRAKE

BACKGROUND OF THE INVENTION

The present invention relates to a brake disc for a vehicle disc brake, comprising a radially inner hub portion intended to be non-rotatably joined to a wheel hub, a surrounding, radially outer disc portion with opposing frictional surfaces and passages formed in the outer disc portion, said passages being arranged to conduct cooling air in the disc material between the frictional surfaces.

So-called ventilated brake discs, which are made to increase the cooling effect of the ambient air by diverting heat generated during braking, occur in two principle types. One type has channels which extend radially through the disc from the inner periphery of the hub to the outer periphery of the surrounding disc portion. The channels thus have inlet openings in the inner periphery and outlet openings in the outer periphery. As the disc rotates, a guided airflow is created through the channels from the inlet to the outlet. The other type of ventilated brake disc consists of two disc elements, which are fixed to a hub and to each other side-by-side with an intermediate space created by a plurality of spacers in the form of pillars.

By ventilating the disc, the mean temperature of the disc is reduced. Since the wear on the disc and linings is strongly depending on temperature, a reduction in temperature will have a positive effect on this wear. Furthermore, the highest temperature of the disc is reduced for most driving styles, which in turn reduces the risk of brake fade and the risk of cracking. One disadvantage of having channels opening into the inner periphery of the hub is, however, that the material mass is reduced in that portion of the brake disc where the stresses are greatest, both as regards braking force and temperature difference. The high stresses in connection with the holes in the hub increase the risk of cracking. In the other type of brake disc with spacers in the form of pillars between two disc elements, one does not have the above mentioned negative stress profile, but on the other hand, no fan action is achieved either.

SUMMARY OF THE INVENTION

The purpose of the present invention is to achieve a brake disc of the type described by way of introduction, which is made so that a flow can be established through passages between the frictional surfaces without having to reduce the strength in the hub of the disc.

This is achieved according to the invention by virtue of the fact that the passages have inlets and outlets for cooling air at or in the vicinity of the periphery of the radially outer disc portion and are formed so that, as the disc rotates in at least one direction, a partial vacuum is generated at the outlet so that the surrounding air flows in through the inlet and out through the outlet for cooling of the radially outer disc portion.

The invention is based, in principle, on the above described pillar design of a brake disc but, instead of arranging more or less symmetrical pillar elements between the discs, which do not guide the air in any particular respect, at least certain pillar elements are made as vanes of a radial fan. The vanes are oriented so that a partial vacuum is generated at selected locations of the outer periphery of the disc as the disc rotates in one direction. In this manner, a control flow is achieved through the passages between the frictional surfaces without affecting the strength of the hub portion.

BRIEF DESCRIPTION OF THE DRAWINGS

The invention will be described in more detail below with reference to the examples shown in the accompanying drawings, where:

FIG. 1 shows an end view of a first embodiment of a brake disc according to the invention, FIG. 2 is a cross-section along the line II—II in FIG. 1, FIG. 5 is a cross-section through a third embodiment of a brake disc according to the invention, and FIG. 6 is a cross-section through a fourth embodiment of a brake disc according to the invention.

DESCRIPTION OF THE PREFERRED EMBODIMENT

Figure 4:
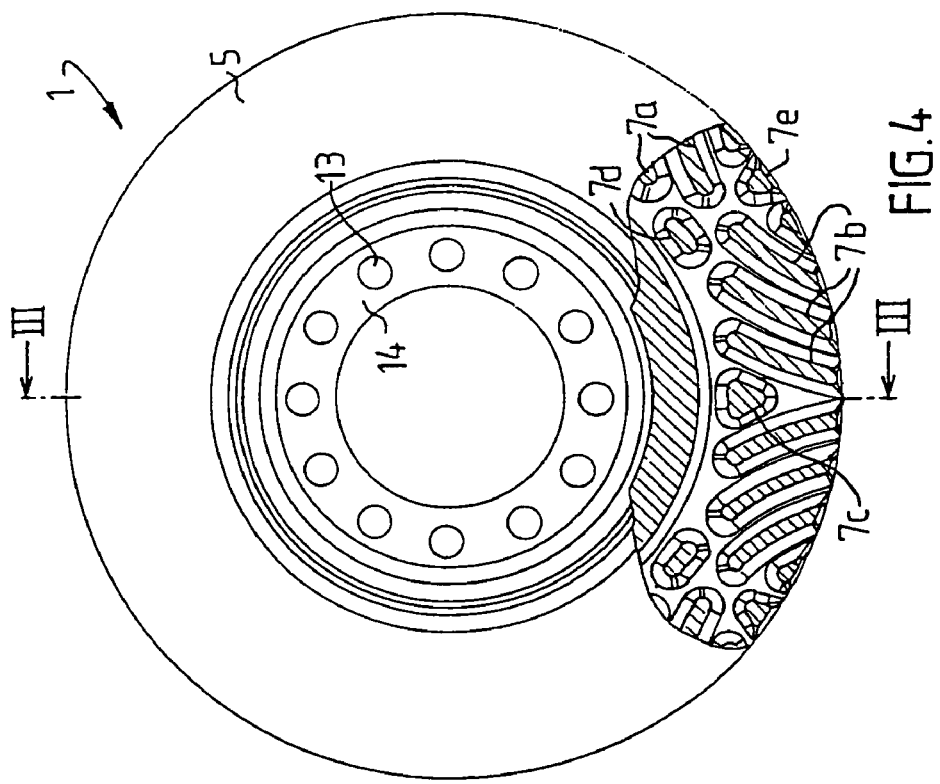
FIG. 4 is a cross-section along the line IV—IV in FIG. 3.

The brake disc 1 shown in FIGS. 1 and 2 has a radially inner hub portion 1a, the inner lateral surface of which is made with splines 2,3 intended to engage corresponding splines in a wheel hub (not shown). Examples of such rotational fixing of the brake disc 1, as an alternative to the more conventional fixing method, which involves screwing a holed fixing flange on the brake disc to a flange on the wheel hub, are shown and described in SE-A-502 189. The hub portion 1a is cast in one piece with a pair of spaced disc elements 4, the surfaces 5 of which facing away from each other forming the brake disc friction surfaces, against which brake pads are pressed during braking. In the intermediate space 7 between the disc elements 4, there are spacer elements 7a, 7b, 7c, 7d, 7e and 7f. The spacer elements 7a and 7b are made as radial fan vanes (also denoted arcuate fingers) and are grouped three-by-three with each group of elements 7a directed oppositely to the group of elements 7b. The spacer elements 7a–7f define passages 8 and 9 between them, through which air flows when the brake disc rotates. When the disc rotates in the direction of the arrow "a", air flows through the passages 8 and 9 in the direction of the arrows "b" by virtue of the fact that the group of spacer elements 7a generate a partial vacuum which is greater than the partial vacuum generated by the spacer element group 7b. Thus, the openings 10 of the passages 8 form inlets to the cooling air passages and the openings 11 of the passages 9 form outlets from the cooling air passages formed of the passages 8, 9. When the brake disc rotates in the opposite direction, the inlets and outlets change places and the air then flows in the opposite direction.

Figure 3:
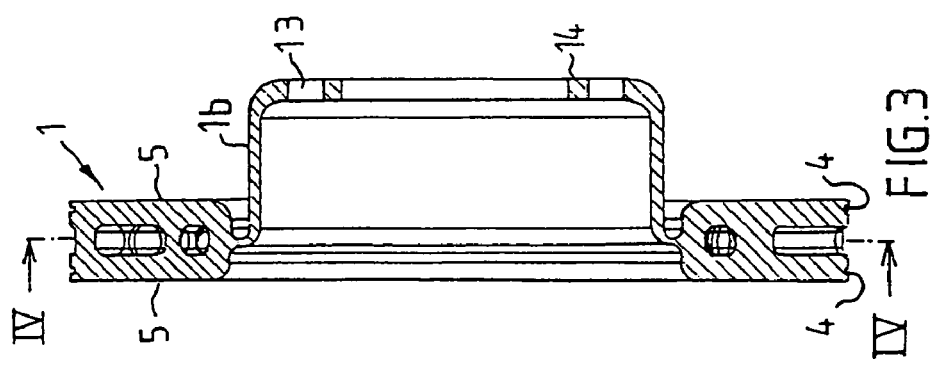
FIG. 3 is a longitudinal section along the line III—III in FIG. 4 through a second embodiment of a brake disc according to the invention.

The embodiment of the brake disc 1 shown in FIGS. 3 and 4 differs from that described above only in that it has a more conventional hub portion 1b comprising a flange 14 provided with holes 13 for screwing the flange 14 securely to a flange on a wheel hub.

FIG. 5 shows an embodiment of a brake disc 1 according to the invention, which lacks the spacer elements corresponding to pillar elements 7a–7f. The brake disc is in this case formed of a single thick disc element in which channels/passages 15 are cast. The channels/passages 15 are, like the passages 8, 9, symmetrical with respect to a plane of symmetry "s", which means that the fan effect will be equally large regardless of the direction of rotation. As is the case with those previously described, this means that the same type of disc can be mounted on the right or left side of the vehicle. The hub portion 1a is provided with splines 2, 3, but as an alternative, it can have the same design as shown in FIGS. 3 and 4.

FIG. 6 shows an embodiment of a brake disc 1, which is optimized for rotation in only one direction, viz. in the direction of the arrow "a". Spacer elements 7a are, as in the embodiment shown in FIG. 2, made as fan vanes to generate a partial vacuum at the openings 11 of the passages 9. Instead of fan vanes 7b (FIG. 2), which, even during rotation in the direction of the arrow "a", generate a partial vacuum, although not as great as that generated by the elements 7a, there are cylindrical spacer elements 7g, which do not generate any partial vacuum at all at the periphery of the disc outside the spacer elements 7g. This means that the pressure difference over the openings 10,11 of the passages 8, 9 formed by the spacer elements 7a and 7g, in the periphery of the disc will be greater than in the embodiment shown in FIG. 2, which will result in greater airflow.

The invention achieves an airflow through the brake disc without weakening the hub portion with through-channels. This provides lower stresses than in known embodiments with radial channels through the hub portion. Furthermore, non-constant bending rigidity is provided over the cross-section of the disc, which reduces the tendency for screeching brakes.

The invention claimed is:

1. A brake disc for a vehicle disc brake, comprising:
a radially inner hub portion (1a) intended to be non-rotatably joined to a wheel hub;
a radially outer disc portion (4) that surrounds the hub portion and that has opposing frictional surfaces (5); and
passages (8, 9) formed in the outer disc portion, said passages being arranged to conduct cooling air in the disc material between the frictional surfaces, all of the passages (8, 9) having inlets (10) and outlets (11) for cooling air at or in the vicinity of an outer periphery of the radially outer disc portion and are formed so that, as the disc (1) rotates in at least one direction, a partial vacuum is generated at the outlet so that the surrounding air flows in through the inlet and out through the outlet for cooling of the radially outer disc portion,
wherein the outer disc portion is formed of two disc elements (4) that are separated by spacer elements (7a–7g), which delimit said passages (8, 9) and of which at least some (7a, 7b) are arcuate fingers, and
wherein the two disc elements and the hub portion are cast in one piece with an outer periphery of the hub portion adjoining an inner periphery of the two disc elements.

2. The brake disc according to claim 1, wherein the inlets (10) and outlets (11) of the passages (8, 9) are disposed in the lateral surface of the radially outer disc portion.

3. The brake disc according to claim 1, wherein the passages (8, 9) are symmetrical relative to a plane of symmetry (S) midway between the inlet (10) and the outlet (11) so that air flows through the passages regardless of the direction of rotation.

4. The brake disc according to claim 1, wherein the hub portion (1a) is not penetrated by said passages (8, 9).

5. The brake disc according to claim 1, wherein the hub portion (1a) has an inner periphery, which is made with axial splines (2, 3) intended to engage corresponding splines on a wheel hub.

6. The brake disc according to claim 1, wherein the hub portion (1b) is provided with a flange (14) provided with holes (13) to screw the flange (14) securely to a fixing flange on the wheel hub.

7. The brake disc according to claim 1, wherein said arcuate fingers curve in a direction opposite a curvature of said outer disc portion.

8. The brake disc according to claim 2, wherein the passages (8, 9) are symmetrical relative to a plane of symmetry (S) midway between the inlet (10) and the outlet (11) so that air flows through the passages regardless of the direction of rotation.

9. The brake disc according to claim 2, wherein the hub portion (1a) is not penetrated by said passages (8, 9).

10. The brake disc according to claim 2, wherein the hub portion (1a) has an inner periphery, which is made with axial splines (2, 3) intended to engage corresponding splines on a wheel hub.

11. A brake disc for a vehicle disc brake, comprising:
a radially inner hub portion (1a) intended to be non-rotatably joined to a wheel hub;
a surrounding, radially outer disc portion (4) with opposing frictional surfaces (5); and
passages (8, 9) formed in the outer disc portion, said passages being arranged to conduct cooling air in the disc material between the frictional surfaces, said passages (8, 9) having inlets (10) and outlets (11) for cooling air at or in the vicinity of the periphery of the radially outer disc portion and are formed so that, as the disc (1) rotates in at least one direction, a partial vacuum is generated at the outlet so that the surrounding air flows in through the inlet and out through the outlet for cooling of the radially outer disc portion, wherein the passages (8, 9) are asymmetrical and optimized as to shape to generate a greater airflow when the disc rotates in one rotational direction than in the other.

12. The brake disc according to claim 11, wherein some of said passages are defined by arcuate fingers that are arranged in groups that have a respective common direction.

* * * * *